US011535167B2

(12) United States Patent
Atkinson et al.

(10) Patent No.: US 11,535,167 B2
(45) Date of Patent: Dec. 27, 2022

(54) CARGO HOLD ASSEMBLY FOR A PICKUP TRUCK CARGO BED

(71) Applicant: ABC TECHNOLOGIES INC., Toronto (CA)

(72) Inventors: Jenessa Atkinson, Richmond Hill (CA); Wade M. Shaw, Toronto (CA); Stefano Tocco, Vaughan (CA); Graham W. Willette, Whitby (CA)

(73) Assignee: ABC TECHNOLOGIES INC., Toronto (CA)

( * ) Notice: Subject to any disclaimer, the term of this patent is extended or adjusted under 35 U.S.C. 154(b) by 0 days.

(21) Appl. No.: 17/375,128

(22) Filed: Jul. 14, 2021

(65) Prior Publication Data

US 2022/0001809 A1    Jan. 6, 2022

Related U.S. Application Data

(63) Continuation of application No. 16/379,608, filed on Apr. 9, 2019, now abandoned.

(60) Provisional application No. 62/655,023, filed on Apr. 9, 2018.

(51) Int. Cl.
*B60R 9/06* (2006.01)
*B60P 7/08* (2006.01)

(52) U.S. Cl.
CPC .............. *B60R 9/06* (2013.01); *B60P 7/0807* (2013.01)

(58) Field of Classification Search
CPC ... B60R 9/06; B60R 11/06; B60R 2011/0078; B60P 7/0807; B60P 7/132; B65D 90/0013; Y10S 24/53; Y10S 24/54; B25H 5/00

USPC ................................................... 224/403–405
See application file for complete search history.

(56) References Cited

U.S. PATENT DOCUMENTS

| | | | |
|---|---|---|---|
| 373,860 A * | 11/1887 | Steffy | A41F 1/008 |
| | | | 24/DIG. 54 |
| 4,751,981 A | 6/1988 | Mitchell et al. | |
| 5,255,951 A | 10/1993 | Moore, III | |
| D373,860 S | 9/1996 | Manke | |
| 5,833,095 A * | 11/1998 | Russell | A45F 5/02 |
| | | | 224/684 |
| 5,988,722 A | 11/1999 | Parri | |
| 6,007,129 A * | 12/1999 | Kearney, Jr. | B60R 11/06 |
| | | | 224/404 |
| 6,662,373 B2 * | 12/2003 | Frank | A45F 5/02 |
| | | | 24/DIG. 54 |
| 7,111,886 B1 | 9/2006 | Miller et al. | |
| 7,484,918 B2 | 2/2009 | Brewster | |
| 7,731,026 B2 | 6/2010 | Harrison | |

(Continued)

*Primary Examiner* — Adam J Waggenspack
(74) *Attorney, Agent, or Firm* — Medler Ferro Woodhouse & Mills PLLC

(57) ABSTRACT

Provided is an accessory mounting system for use in a cargo bed of a pickup truck. The accessory mounting system comprises a cargo hold assembly and at least one accessory member for releasable attachment to the cargo hold assembly. The at least one accessory member is configured to confer a cargo holding functionality to the cargo hold assembly. The cargo hold assembly includes a base configured to be mounted to a side-wall portion of the cargo bed. The base includes a plurality of registration bosses, each being configured to receive a corresponding registration cavity provided on the at least one accessory member. The at least one accessory member may be mountable upon the base in more than one orientation.

20 Claims, 4 Drawing Sheets

(56) References Cited

U.S. PATENT DOCUMENTS

| | | |
|---|---|---|
| 7,806,236 B2 | 10/2010 | Scholen et al. |
| 8,052,019 B2 | 11/2011 | Plavetich |
| 8,302,785 B2 | 11/2012 | Kao |
| 8,505,794 B2 | 8/2013 | Ardigo |
| 8,820,811 B1 | 9/2014 | Hemphill et al. |
| 9,487,152 B2 | 11/2016 | Scott et al. |
| 10,435,082 B1 | 10/2019 | Kupina et al. |
| 2019/0009838 A1* | 1/2019 | Rosenfeld .............. B65G 57/09 |
| 2019/0092213 A1* | 3/2019 | Beenen .................... B60R 7/02 |
| 2019/0219081 A1* | 7/2019 | Hagedorn ............... F16B 21/09 |

* cited by examiner

CARGO HOLD ASSEMBLY FOR A PICKUP TRUCK CARGO BED

CROSS-REFERENCE TO RELATED APPLICATION

The present application is a continuation of prior U.S. application Ser. No. 16/379,608, filed on Apr. 9, 2019, which claims the benefit of prior U.S. Application No. 62/655,023, filed on 9 Apr. 2018, the contents of which are incorporated by reference herein.

FIELD OF THE INVENTION

The present invention pertains to the field of cargo holders, in particular to a cargo holder for use in the cargo bed of a pickup truck.

BACKGROUND

The current increase in the utilization of the pickup truck as a means of transportation also sees the vehicle used for non-commercial uses. In addition to the conventional use where pickup trucks were used for transporting construction goods (i.e. sand, bags of cement, shovels, lumber and other equipment), the current market sees a much broader utilization of this cargo space. While lumber and building supplies are the staple of the DIY industry, pickup trucks see a much broader utilization, with the cargo box being used to move just about anything, including but not limited to skis, bikes, camping gear and all sorts of sporting goods. One common struggle with the cargo bed of a pickup truck is that its vast space makes it difficult to manage placement and retention of goods while in transport. Bags of groceries fail over and the contents slide and roll around the inside of the bed. Large items contained in the cargo box can move around with considerable force, increasing the chance of damage to both the goods and the truck itself.

There is a need for a simple, easily adjustable cargo management system for use with a truck bed and which will allow items contained in the cargo bed to be safely retained during transport.

SUMMARY OF THE INVENTION

According to an aspect of the disclosure, provided is an accessory mounting system for use in a cargo bed of a pickup truck. The accessory mounting system comprises a cargo hold assembly and at least one accessory member for releasable attachment to the cargo hold assembly. The at least one accessory member is configured to confer a cargo holding functionality to the cargo hold assembly. The cargo hold assembly includes a base configured to be mounted to a side-wall portion of the cargo bed. The base includes a plurality of registration bosses, each being configured to receive a corresponding registration cavity provided on the at least one accessory member. The at least one accessory member may be mountable upon the base in more than one orientation.

BRIEF DESCRIPTION OF THE DRAWINGS

The foregoing and other features and advantages of the invention will be apparent from the following description of embodiments thereof as illustrated in the accompanying drawings. The accompanying drawings, which are incorporated herein and form a part of the specification, further serve to explain the principles of the invention and to enable a person skilled in the pertinent art to make and use the invention. The drawings are not to scale.

DETAILED DESCRIPTION OF EMBODIMENTS OF THE PRESENT INVENTION

Figure 1:
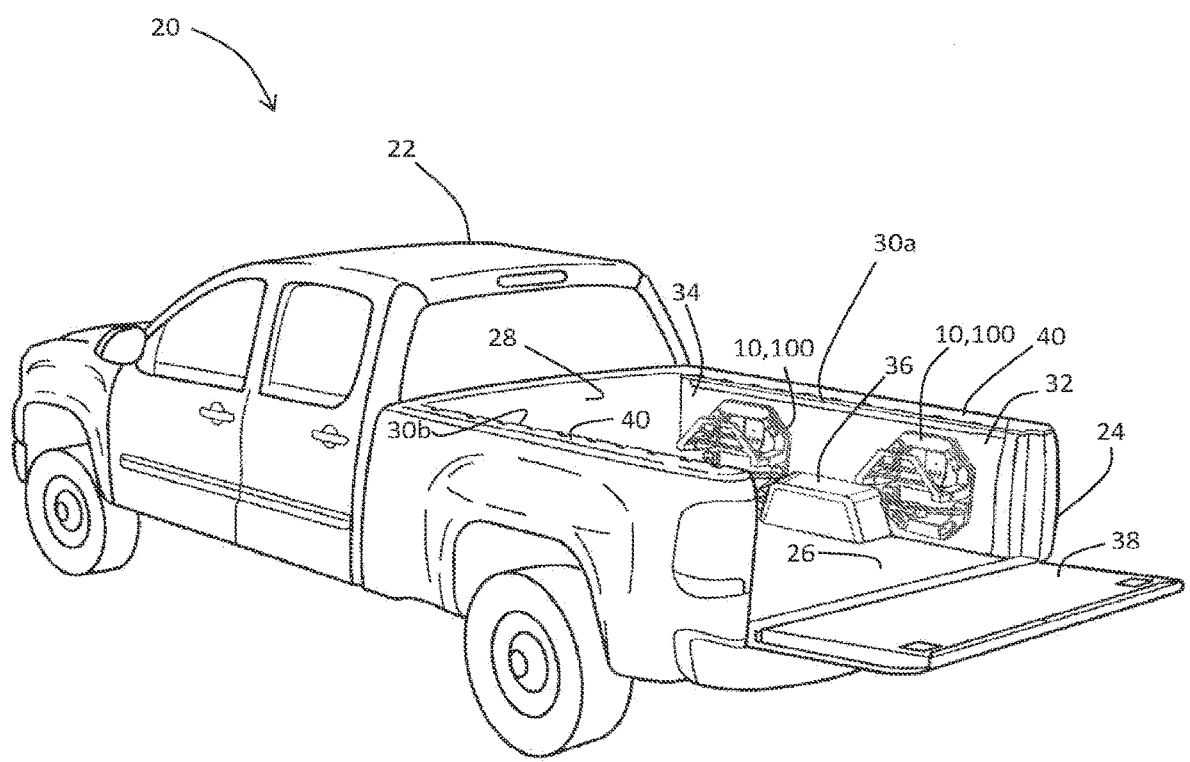
FIG. 1 is a perspective view of a pickup truck.

Specific embodiments of the present invention will now be described with reference to the figures, wherein like reference numbers indicate identical or functionally similar elements. The following detailed description is merely exemplary in nature and is not intended to limit the disclosure or the application and uses of the disclosure. A person skilled in the relevant art will recognize that other configurations and arrangements can be used without departing from the scope of the disclosure. Furthermore, there is no intention to be bound by any expressed or implied theory presented in the preceding technical field or the following detailed description.

It should be noted that in the description, terms such as forward, front and derivations of these terms are intended to mean or refer to an orientation directed towards, or a location situated towards the front of the vehicle or component in question relative to its orientation within a vehicle. Similarly, terms such as rearward, rear and derivations of these terms are intended to mean or refer to an orientation directed towards, or a location situated towards the back of the vehicle or component in question relative to its orientation within a vehicle. Terms such as up, upper, upward, and derivations of these terms are intended to mean or refer to an orientation that is above or on a top-side of the vehicle or component in question relative to its orientation within a vehicle. Terms such as lower, down, downward, and derivations of these terms are intended to mean or refer to an orientation that is below or on a bottom-side of the vehicle or component in question relative to its orientation within a vehicle. The term outer, outboard, outside and derivations of these terms is intended to mean or refer to an orientation directed towards, or a location situated outwardly from the side of the vehicle or component in question relative to its orientation within a vehicle. The term inner, inboard, inside and derivations of these terms is intended to mean or refer to an orientation directed towards, or a location situated towards the longitudinal centerline of the vehicle, or component in question relative to its orientation within a vehicle.

In addition, the terms "in particular", "for example", and similar terms are used in association with optional features without thereby restricting alternative embodiments. Thus, features which are introduced by these terms are optional features, and there is no intention to restrict the scope of protection of the claims and, in particular, the independent claims by means of these features. Thus, as a person skilled in the art will recognize, the invention can also be implemented using different embodiments. In a similar way, features which are introduced by "in one embodiment of the invention" or by "in one illustrative embodiment of the invention" are understood to be optional features without any intention thereby to restrict alternative embodiments or the scope of protection of the independent claims. Moreover, these introductory expressions are not intended to affect all the ways of combining the features introduced thereby with other features, whether optional or non-optional features.

Referring now to FIG. 1, shown is a pickup truck 20 having a cab 22 and a cargo bed 24 situated rearward therefrom. The cargo bed 24 comprises a floor 26, an upstanding forward wall 28 immediately adjacent and rearward of the cab 22, and two upstanding opposing side-wall sections 30a, 30b. Each side wall section 30a, 30b includes a first side-wall portion 32 and a second side-wall portion 34, the first and second side-wall portions 32, 34 being separated by a wheel well 36. Opposite to the forward wall 28 towards the rear of the cargo bed 24 is situated a tailgate 38. The tailgate 38 is provided with a hinge assembly (not shown) permitting the tailgate 38 to pivot from a generally vertical/upright closed position, to a generally horizontal open position as required by the operator. As shown, the tailgate 38 is in the open position. The forward wall 28 and the two opposing side wall sections 30a, 30b define an upper wall surface that is generally planar. The upper wall surface is collectively regarded as the bed rail 40.

Figure 2:
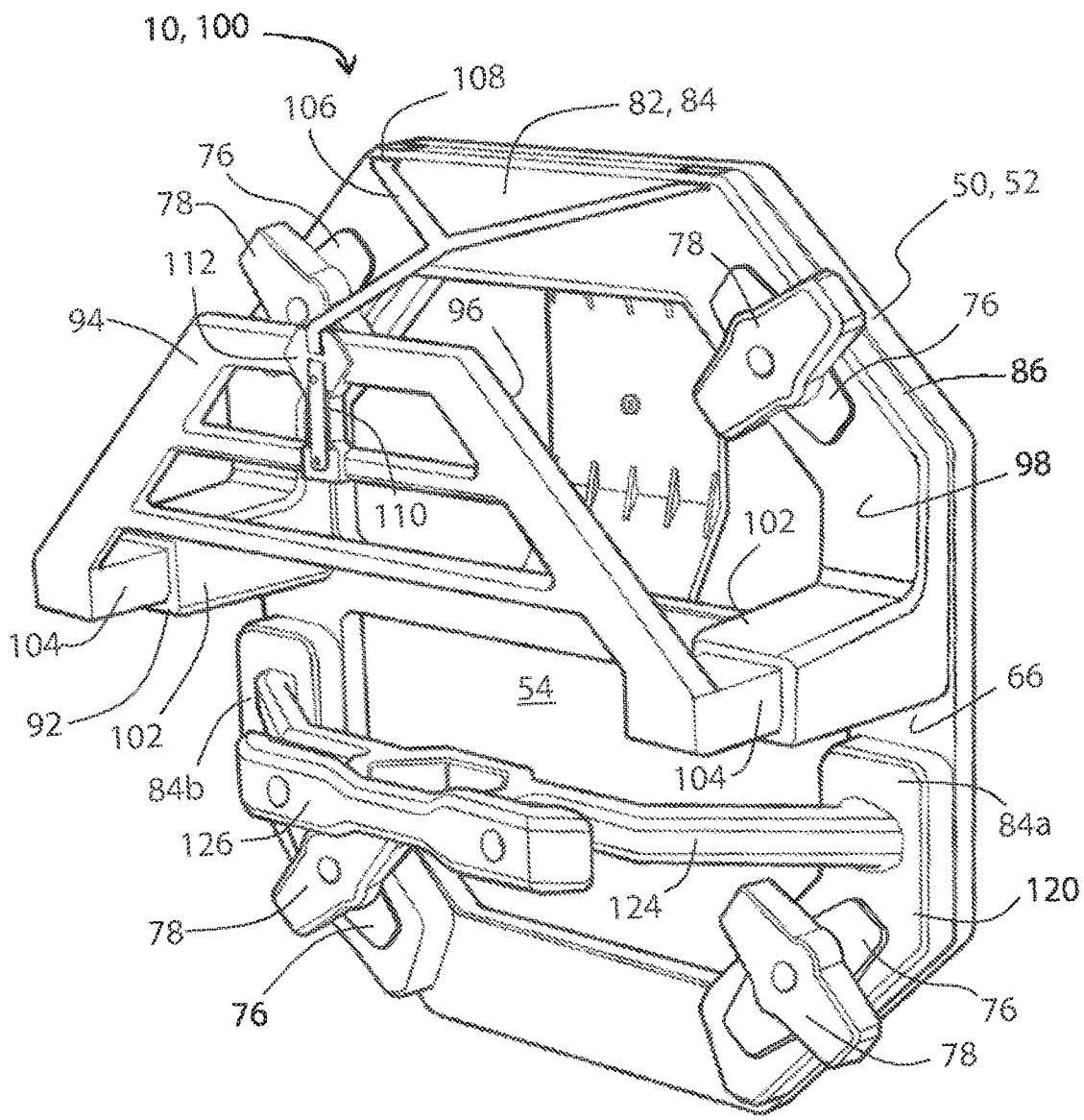
FIG. 2 is a perspective view of a cargo hold assembly according to an embodiment of the invention, including a first and second accessory member.
Figure 3:
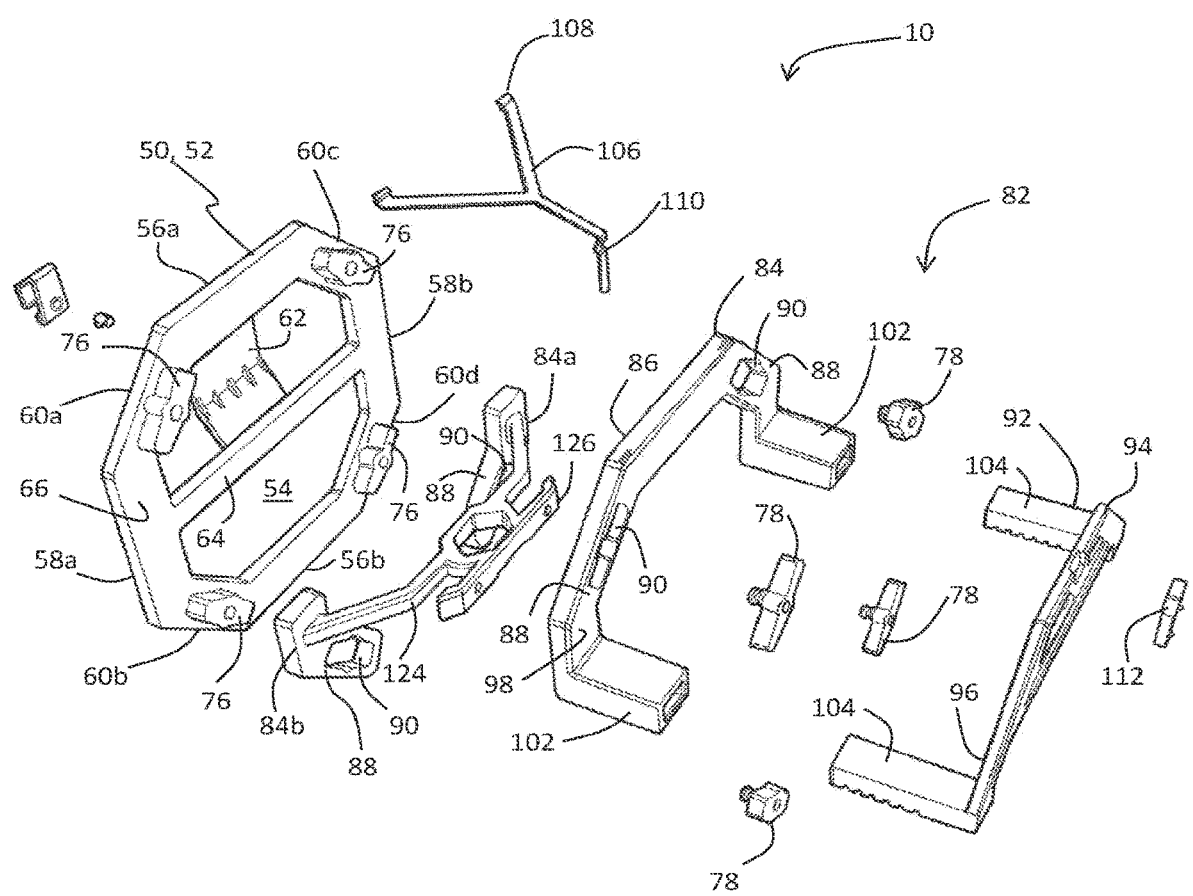
FIG. 3 is an exploded perspective view of the cargo hold assembly according to FIG. 2.

Referring now to FIGS. 2 and 3, shown is a cargo hold assembly 10. The cargo hold assembly 10 is configured to be mounted upon the side wall sections 30a, 30b of the cargo bed 24, in particular the areas defined by the first and second side-wall portions 32, 34. Depending on the intended purpose and required functionality, a cargo bed 24 may contain a single cargo hold assembly 10, or a plurality of cargo hold assemblies 10. In general, the cargo hold assemblies 10 may be installed as pairs, for example upon the first and second side-wall portions 32, 34 of one or both of the side wall sections 30a, 30b. To simplify the description which follows, the cargo hold assembly 10 will be described with reference to being mounted upon the first side wall portion 32 of the side wall section 30a.

The cargo hold assembly 10 includes a base 50 that is configured to be mounted to the first side wall portion 32 of the side wall section 30a of the cargo bed 24. The base 50 includes a body 52 that forms an anchorage for a variety of accessory members that can be releaseably attached to the base 50, depending on the intended use of the cargo hold assembly 10. The body 52 has a general structure of a polygonal frame. In the embodiment shown, the body 52 is octagonal in shape, with an opening 54 in the center. Accordingly, the body 52 includes a first and second horizontal segment 56a, 56b, a first and second vertical segment 58a, 58b, and a corner segment 60a, 60b, 60c, 60d at each corner to connect adjacent horizontal and vertical segments.

The base 50 includes a mount plate 62 supported in the opening 54, to facilitate attachment of the base 50 to a receiving surface, in this case the first side wall portion 32. The mount plate 62 is configured to cooperate with one or more fasteners (i.e. threaded fasteners) to mount the base 50 to the first side wall portion 32. To provide additional structural support to the base 50 and the mount plate 62, the base 50 may also include one or more support braces. In the embodiment shown, the mount plate 62 is supported along one edge by the first horizontal segment 56a, and on an opposing edge by a single support brace 64. Although the exemplary embodiment shows a mount plate 62 for attachment using suitable fasteners, in other embodiments a 'press-fit' installation may be used. For example, in some embodiments, the base may include a telescoping fixture that permits it to be securely mounted between the cargo bed 24 and the underside of the bed rail 40, without the use of fasteners and the requirement to drill holes in the cargo bed. The telescoping fixture may be spring actuated, or otherwise configured to establish a frictional fit between the upper and lower ends of the telescoping fixture and the corresponding receiving surfaces, namely the underside of the bed rail and the cargo bed, therein retaining the base in position.

The base 50 has a generally planar surface 66. Situated on each corner segment 60a, 60b, 60c, 60d is at least one registration boss. In the embodiment shown, each corner segment 60a, 60b, 60c, 60d includes a single registration boss 76. The registration boss 76 is configured to cooperate with a corresponding registration cavity provided on the accessory members, as will be described in greater detail below. The registration boss 76 may also include as part of a locking mechanism to releaseably attach the accessory members as needed. Examples of locking mechanisms may include, but are not limited to a lock handle 78 configured for threaded or bayonet-style attachment, quarter-turn locks as well as push-pull locking systems. In general, the lock handle 78 is rotatable in a way that permits for mounting of the accessory member upon the base in a first position, and locks the accessory member upon the base in a second position.

Accessory Members

The term 'accessory member' is used generically to denote any accessory fixture that can be attached to the base 50, with registration upon and releasable attachment to the one or more registration bosses 76. In general, any accessory member configured for use with the cargo hold assembly will be configured to confer a designed cargo holding functionality. Accordingly, a variety of accessory members may be designed and made available for use upon the base 50. The base 50 is intended to be used with a range of accessory members that correspond to the shape, geometry, etc. of the registration features. In this way, the base 50 forms the basis of an accessory mounting system 100 that can be used with any accessory member having the matching registration features.

$1^{st}$ Accessory Member

Although accessory members may come in a variety of configurations, and will be constructed in accordance with their intended purpose, all accessory members will generally include a mounting frame that releasably mounts upon the base 50. With regard to the embodiment shown in FIGS. 2 and 3, shown is an exemplary accessory member, herein referred to as a first accessory member 82. The first accessory member 82 includes a mounting frame 84 that has a base engagement surface 86 that engages the planar surface 66 of the base 50. The mounting frame 84 also provides at least one registration region 88 that includes the registration features necessary for registration and releasable attachment to the base 50. As shown, the registration features provided on the registration region 88 include a registration cavity 90, dimensioned for mating engagement with the registration boss 76 provided on the base 50. Consistent with the aforementioned accessory mounting system, a variety of accessory members can be constructed to include a mounting frame 84 having one or more registration regions 88 to permit mating engagement between the registration cavity 90 on the mounting member 84 and the registration boss on the base 50.

The number of registration regions 88 on a mounting frame 84 is generally dictated by the number of registration bosses 76 the accessory member is designed to releasably attach to. In some embodiments, an accessory member may include only a single registration region 88. In other embodiments, the accessory member may include a pair of registration regions 88, each having a corresponding registration cavity 90. The arrangement and spacing of the registration cavities 90 is selected to permit for engagement with a corresponding pair of registration bosses 76 on the base 50. Where further strength and support is required, the accessory member may include 4 registration regions, again arranged and spaced-apart to correspond to the receiving registration bosses 76 on the base 50.

The first accessory member 82 includes two registration regions 88 that each provide a registration cavity 90 that enables secure mounting of the first accessory member 82 to corresponding registration bosses 76 on the base 50.

In terms of user functionality, the first accessory member 82 is configured in the form of an adjustable rack assembly, and includes an adjustable rack portion 92. The rack portion 92 provides a cargo support wall 94 that is positionable to provide an adjustable cargo retention area between a cargo engagement surface 96 of the cargo support wall 94 and a cargo engagement surface 98 of the mounting frame 84. The adjustable rack portion 92, and in particular the cargo support wall 94 is moveable between a first position that has a first cargo carrying capacity, and a second position that has a second cargo carrying capacity, where the second cargo carrying capacity is greater than the first cargo carrying capacity. The positioning of the cargo support wall is facilitated through at least one telescoping extension provided between the mounting frame 84 and the rack portion. As shown, the mounting frame 84 provides a pair of first extensions 102, which cooperate with a mating pair of second extensions 104 provided on the rack portion cargo support wall 94. The first extensions 102 are integrally formed with the mounting frame 84, while the second extensions 104 are integrally formed with the rack portion 92. The telescoping arrangement as shown has the second extensions 104 seating and sliding within the first extensions 102, although a reverse arrangement, that is where the first extensions 102 seat and slide within the second extensions 104 is also possible. Although not shown, the first and second extensions 102, 104 will include a locking feature to selectively lock the second extension 104 relative to the first extension 102 at a position corresponding to the desired cargo carrying capacity.

The first accessory member 82 may additional include retention straps 106 or similar tie-down and/or elasticized devices to prevent the dislodgement of cargo during use. As shown, the retention strap 106 is attached on a first end 108 to an upper surface of the mounting frame 84. The retention strap 106 is then releaseably attached on a second end 110 to the rack portion 92. The releasable attachment between the second end 110 and the rack portion 92 may be facilitated through a suitable clasp or locking fixture 112.

2$^{nd}$ Accessory Member

FIGS. 2 and 3 also show a second accessory member 120, configured in the form of a cargo tie-down. The second accessory member 120 provides a two-part mounting frame 84a, 84b, where each portion of the two-part mounting frame 84a, 84b corresponds to a respective registration region 88 and registration cavity 90. Between the registration regions 88 spans a bridge 124 which supports a tie-down cleat 126. It will be appreciated that the cleat may be formed in a variety of configurations, and the shape shown is merely exemplary.

Accessory Mounting System

Figure 4:
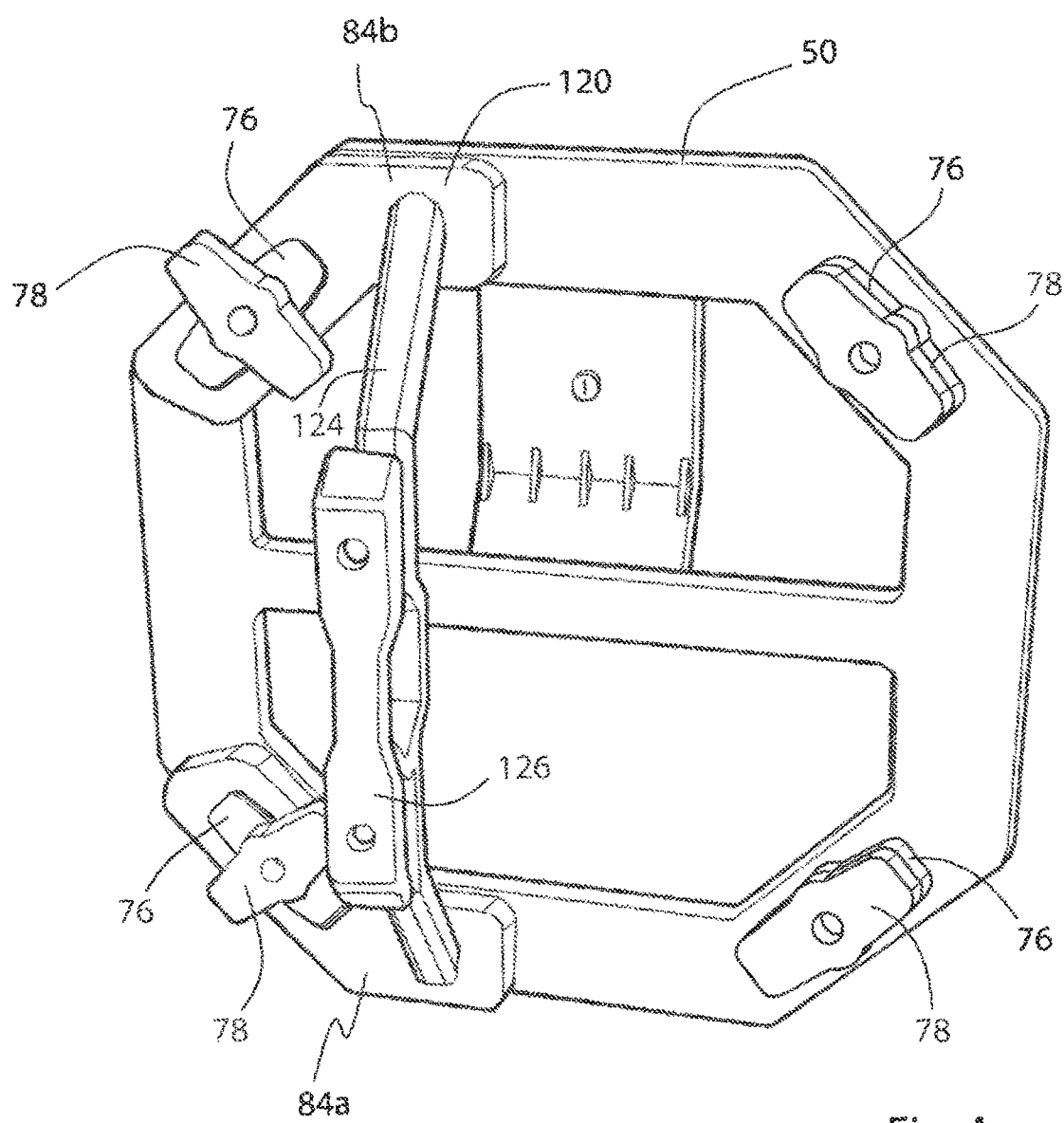
FIG. 4 is a perspective view of the cargo hold assembly according to FIG. 2, without the first accessory member, and showing the second accessory member in a vertical orientation.

The accessory mounting system 100 is configured to enable the accessory members to be mounted at various positions around the base 50. The registration bosses 76 provided on the base 50 are spaced apart such that the distance between any two registration bosses 76, taken either horizontally, or vertically is the same. In this way, the mounting frame 84 of any accessory member can be mounted in a variety of ways, as shown for example with respect to the second accessory member 120. In FIG. 2, the second accessory member 120 is shown in a generally horizontal orientation, while in FIG. 4, the second accessory member 120 is shown in a generally vertical orientation. The ability to locate the accessory member at different locations and orientations increases the versatility of the accessory member, permitting for a variety of user configurations as deemed to be necessary for the intended purpose.

Materials

The cargo hold assembly, and in particular the components that establish the overall structural integrity of the assembly, for example the base and mounting frame components, may be manufactured from any suitable material including, but not limited to metals and plastics.

Suitable metals may include, but are not limited to:
1. Mild Steel (sheet/tubing)—painted, powder coated
2. Zinc-plated steel (Fasteners)
3. Stainless Steel (Sheet/tubing/fasteners)
4. Aluminum (tubing/channels)—anodized
5. Spring Steel Suitable plastics may include, but are not limited to:
1. Polypropylene (PP)-(glass-filled, or carbon-fiber filled)
2. Nylon/Polyamide (PA) (11, 12, 6, 66)-(glass-filled, or carbon-fiber filled)
3. High-density polyethylene (HDPE)
4. Acrylonitrile butadiene styrene (ABS)
5. Acrylonitrile butadiene styrene/polycarbonate (ABS-PC)
6. ethylene propylene diene monomer (EPDM)
7. polypropylene-ethylene propylene diene monomer (PP-EPDM)
8. TPE (thermoplastic Elastomers)

The use of plastics may be further enhanced through the use of fillers, including but not limited to natural fibers, glass fiber, virgin and/or recycled carbon fiber, colours/dyes, as well as fillers that confer UV resistance and/or chemical resistance. It will be appreciated that the cargo hold assembly may be manufactured from a combination of materials, for example where the base is formed of a metal material, while the mounting frame forming part of the accessory member is formed of a plastic material. Contact surfaces that are intended to grip and retain cargo may be provided with rubber or rubber-like materials to prevent slipping or dislodgement during use.

While various embodiments according to the present invention have been described above, it should be understood that they have been presented by way of illustration and example only, and not limitation. It will be apparent to persons skilled in the relevant art that various changes in form and detail can be made therein without departing from the scope of the invention. Thus, the breadth and scope of the present invention should not be limited by any of the above-described exemplary embodiments, but should be defined only in accordance with the appended claims and their equivalents. It will also be understood that each feature of each embodiment discussed herein, and of each reference cited herein, can be used in combination with the features of any other combination. All patents and publications discussed herein are incorporated by reference herein in their entirety.

What is claimed is:

1. An accessory mounting system for use in a cargo bed of a pickup truck, the accessory mounting system comprising:
   a cargo hold assembly including a base configured to be mounted to a side-wall portion of the cargo bed, the base having a plurality of registration bosses extending outward therefrom;
   an accessory member having at least two registration cavities each of which is configured for releasable attachment to a corresponding registration boss of the plurality of registration bosses of the cargo hold assembly, the accessory member being configured to confer a cargo holding functionality to the cargo hold assembly, wherein the at least two registration cavities of the accessory member and the corresponding registration bosses of the cargo hold assembly are configured to have corresponding shapes, dimensions, and relative orientations for mating engagement therebetween, and wherein the accessory member is configured to be mountable upon the base in each of a horizontal orientation and a vertical orientation; and
   a locking mechanism having a lock handle rotatably mounted on each of the plurality of registration bosses, wherein each lock handle is configured to be rotated between a first position for mounting the accessory member onto the corresponding registration bosses on the base of the cargo hold assembly, and a second position for securing the accessory member to the corresponding registration bosses on the base of the cargo hold assembly.

2. The accessory mounting system according to claim 1, wherein the base includes a body having a form of a polygonal frame.

3. The accessory mounting system according to claim 2, wherein the polygonal frame of the base is octagonal in shape, and includes a first horizontal segment and a second horizontal segment, a first vertical segment and a second vertical segment, and four corner segments, each corner segment serving to interconnect an adjacent first or second horizontal segment with an adjacent first or second vertical segment.

4. The accessory mounting system according to claim 3, wherein each corner segment includes at least one registration boss of the plurality of registration bosses.

5. The accessory mounting system according to claim 1, wherein the base includes a mount plate to facilitate attachment of the base to a receiving surface in the cargo bed.

6. The accessory mounting system according to claim 1, wherein the accessory member includes a mounting frame that includes a base engagement surface that engages a complementary planar surface on the base.

7. The accessory mounting system according to claim 6, wherein the mounting frame of the accessory member includes at least two registration regions each of which has one of the at least two registration cavities.

8. The accessory mounting system according to claim 1, wherein the accessory member is an adjustable rack assembly.

9. The accessory mounting system according to claim 1, wherein the accessory member is a cargo tie-down.

10. The accessory mounting system according to claim 1, wherein when the at least two registration cavities of the accessory member are mounted on the corresponding registration bosses of the cargo hold assembly each of the registration bosses fills its corresponding registration cavity to prevent relative movement between the accessory member and the cargo hold assembly.

11. An accessory mounting system for use in a cargo bed of a pickup truck, the accessory mounting system comprising:
    a cargo hold assembly including a base configured to be mounted to a side-wall portion of the cargo bed, the base including a plurality of registration bosses extending outward therefrom; and
    an adjustable rack assembly for releasable attachment to the cargo hold assembly, wherein the adjustable rack assembly is moveable between a first position that has a first cargo carrying capacity and a second position that has a second cargo carrying capacity, the second cargo carrying capacity being greater than the first cargo carrying capacity, the adjustable rack assembly having at least two registration cavities each of which is configured for releasable attachment to a corresponding registration boss of the plurality of registration bosses of the cargo hold assembly, wherein the corresponding registration bosses of the plurality of registration bosses and the at least two registration cavities provided on the adjustable rack assembly are configured to have corresponding shapes, dimensions, and relative orientations for mating engagement therebetween; and
    a locking mechanism having lock handles rotatably mounted on each of the plurality of registration bosses, wherein the lock handles are configured to be rotated between a first position for mounting the adjustable rack assembly onto the corresponding registration bosses on the base of the cargo hold assembly, and a second position for securing the adjustable rack assembly to the corresponding registration bosses on the base of the cargo hold assembly.

12. The accessory mounting system according to claim 11, wherein the base includes a mount plate to facilitate attachment of the base to a receiving surface in the cargo bed.

13. The accessory mounting system according to claim 11, wherein the adjustable rack assembly includes a mounting frame having a base engagement surface that is configured to engage a complementary planar surface on the base, the mounting frame including at least two registration regions each having a respective registration cavity of the at least two registration cavities configured to engage the complementary registration bosses provided on the base.

14. The accessory mounting system according to claim 11, further comprising a second accessory member.

15. The accessory mounting system according to claim 14, wherein the second accessory member is a cargo tie-down.

16. The accessory mounting system according to claim 11, wherein when the at least two registration cavities of the adjustable rack assembly are mounted on the corresponding registration bosses of the cargo hold assembly each of the registration bosses fills its corresponding registration cavity to prevent relative movement between the adjustable rack assembly and the cargo hold assembly.

17. An accessory mounting system for use in a cargo bed of a pickup truck, the accessory mounting system comprising:
    a cargo hold assembly including a base configured to be mounted to a side-wall portion of the cargo bed, wherein the base includes a body having a polygonal frame having first, second, third and fourth corner segments, each of the first, second, third and fourth corner segments including a respective first, second, third and fourth registration boss, wherein a distance between any two adjacent registration bosses, taken either horizontally or vertically, is the same; and an accessory member for releasable attachment to the cargo hold assembly, the accessory member being configured to confer a cargo holding functionality to the cargo hold assembly, the accessory member having at least a first registration cavity and a second registration cavity for selective releasable attachment to each of a first pair of the first, second, third and fourth registration bosses that are horizontally adjacent, and a second pair of the first, second, third and fourth registration bosses that are vertically adjacent, such that the accessory member is mountable upon the base of the cargo hold assembly in each of a horizontal orientation and a vertical orientation, and wherein the first and second registration cavities and the first and second pairs of the first, second, third and fourth registration bosses are configured to have corresponding shapes, dimensions, and relative orientations for mating engagement therebetween.

18. The accessory mounting system according to claim 17, wherein the accessory member is a first accessory member and the mounting system further includes a second accessory member.

19. The accessory mounting system according to claim 18, wherein the first accessory member is an adjustable rack assembly, and the second accessory member is a cargo tie-down.

20. The accessory mounting system according to claim 17, further comprising:

a locking mechanism having a lock handle rotatably mounted on each of the first, second, third and fourth registration bosses, wherein the lock handles are configured to be rotated between a first position for mounting the accessory member onto the corresponding first or second pair of registration bosses on the base of the cargo hold assembly, and a second position for securing the accessory member to the corresponding first or second pair of registration bosses on the base of the cargo hold assembly.

* * * * *